(12) United States Patent
Sekine et al.

(10) Patent No.: US 12,333,620 B2
(45) Date of Patent: Jun. 17, 2025

(54) OPERATION CONTROL APPARATUS, OPERATION CONTROL METHOD, AND NON-TRANSITORY COMPUTER READABLE MEDIUM

(71) Applicant: NEC Corporation, Tokyo (JP)

(72) Inventors: Shigeru Sekine, Tokyo (JP); Tsuyoshi Shibata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 330 days.

(21) Appl. No.: 17/797,178

(22) PCT Filed: Feb. 20, 2020

(86) PCT No.: PCT/JP2020/006740
§ 371 (c)(1),
(2) Date: Aug. 3, 2022

(87) PCT Pub. No.: WO2021/166147
PCT Pub. Date: Aug. 26, 2021

(65) Prior Publication Data
US 2023/0058114 A1    Feb. 23, 2023

(51) Int. Cl.
*G07C 9/00*      (2020.01)
*G06Q 50/26*    (2012.01)
*G08G 5/30*     (2025.01)

(52) U.S. Cl.
CPC ............. *G06Q 50/26* (2013.01); *G08G 5/30* (2025.01)

(58) Field of Classification Search
CPC ........ G06Q 50/26; G08G 5/003; G06V 20/53; G07C 9/00

(Continued)

(56) References Cited

U.S. PATENT DOCUMENTS 12,008,901 B2 * 6/2024 Ji ..................... G06Q 10/06315
2019/0173741 A1 * 6/2019 Hieb ..................... H04L 12/10
(Continued)

FOREIGN PATENT DOCUMENTS

JP    2007055727 A  * 3/2007
JP    2012-194766 A   10/2012
(Continued)

OTHER PUBLICATIONS

International Search Report for PCT Application No. PCT/JP2020/006740, mailed on Aug. 25, 2020.
(Continued)

*Primary Examiner* — Shardul D Patel

(57) ABSTRACT

An operation control apparatus (10) includes a data acquisition unit (110) and an apparatus control unit (120). The data acquisition unit (110) acquires first congestion data. In a present example, the data acquisition unit (110) generates the first congestion data by processing an image generated by an image capture unit. The image processing performed herein includes, for example, processing of counting the number of persons in a crowd. The apparatus control unit (120) controls an apparatus to be controlled by using the first congestion data. For example, when the first congestion data exceed a reference value, the apparatus control unit (120) reduces the number of operating apparatuses to be controlled and lowers a response speed of the apparatus to be controlled in such a way that the number of persons moving from a second area to a first area per unit time decreases.

9 Claims, 5 Drawing Sheets

(58) Field of Classification Search
USPC .......................................................... 701/120
See application file for complete search history.

(56) References Cited

U.S. PATENT DOCUMENTS

| 2021/0409791 | A1* | 12/2021 | Larrew | .............. | H04N 21/4223 |
| 2021/0409817 | A1* | 12/2021 | Larrew | .................. | G06V 20/52 |
| 2023/0017751 | A1* | 1/2023 | China | ..................... | G06F 3/012 |

FOREIGN PATENT DOCUMENTS

| JP | 2013189288 | A | * | 9/2013 | | |
| WO | WO-2013014970 | A1 | * | 1/2013 | ............. | G06Q 50/30 |

OTHER PUBLICATIONS

NEC, "Waiting Time Forecast System" at Haneda Airport (Tokyo International Airport), [online], Feb. 16, 2020 [retrieved on Jun. 3, 2020], Internet: <URL:https://web.archive.org/web/20200216055744/https://jpn.nec.com/press/201912/20191212_02.html>, pp. 1-2.

Miyazaki, Shinji et al. "Congestion Estimation System Using Group Behavior Analysis Technology.", [online], vol. 67, No. 1, Aug. 23, 2017 [retrieved on Jun. 3, 2020], Internet: <URL:https://web.archive.org/web/20170823153243/https://jpn.nec.com/techrep/journal/g14/n01/pdf/140117.pdf>, pp. 82-85.

* cited by examiner

OPERATION CONTROL APPARATUS, OPERATION CONTROL METHOD, AND NON-TRANSITORY COMPUTER READABLE MEDIUM

This application is a National Stage Entry of PCT/JP2020/006740 filed on Feb. 20, 2020, the contents of all of which are incorporated herein by reference, in their entirety.

TECHNICAL FIELD

The present invention relates to an operation control apparatus, an operation control method, and a program.

BACKGROUND ART

A person feels stress when a destination is congested. To deal with this, estimating a degree of congestion at a destination is generally performed. For example, Patent Document 1 describes an apparatus that estimates congestion at a procedure place where a procedure relating to a vehicle is performed. The apparatus first calculates, for each predetermined time division with a departure time of an already-departed flight as a starting time of calculation, a proportion of the number of persons arriving at a procedure place to the number of persons having a reservation. Then, the apparatus estimates a degree of congestion at the procedure place by using the proportion of each time division, the number of persons having a reservation for a flight being going to depart, and a reservation time.

CITATION LIST

Patent Literature

[Patent Document 1] Japanese Patent Application Publication No. 2012-194766

SUMMARY OF INVENTION

Technical Problem

The present inventor has examined a technique for preventing congestion at a predetermined area of an airport. An object of the present invention is to prevent congestion at a predetermined area of an airport.

Solution to Problem

According to the present invention, provided is an operation control apparatus including:
a data acquisition unit that acquires first congestion data indicating a status of congestion at a first area in an airport; and
an apparatus control unit that controls, by using the first congestion data, an apparatus to be controlled that is positioned between a second area in the airport and the first area and should be used by an airplane passenger.
According to the present invention, provided is an operation control method including:
by a computer,
acquiring first congestion data indicating a status of congestion at a first area in an airport and second congestion data indicating a status of congestion at a second area in the airport; and
controlling, by using the first congestion data and the second congestion data, an apparatus to be controlled that is positioned between the first area and the second area and should be used by an airplane passenger.

According to the present invention, provided is a program causing a computer to include:
a function of acquiring first congestion data indicating a status of congestion at a first area in an airport and second congestion data indicating a status of congestion at a second area in the airport; and
a function of controlling, by using the first congestion data and the second congestion data, an apparatus to be controlled that is positioned between the first area and the second area and should be used by an airplane passenger.

Advantageous Effects of Invention

According to the present invention, congestion at a predetermined area of an airport can be prevented.

BRIEF DESCRIPTION OF DRAWINGS

The above-described object and other objects, features, and advantageous effects become more apparent from the preferred example embodiments described below and the following accompanying drawings.

EXAMPLE EMBODIMENT

Hereinafter, example embodiments of the present invention will be described by using the drawings. Note that, a similar component is assigned with a similar reference sign throughout all the drawings, and description thereof is not repeated as appropriate.

First Example Embodiment

Figure 1:
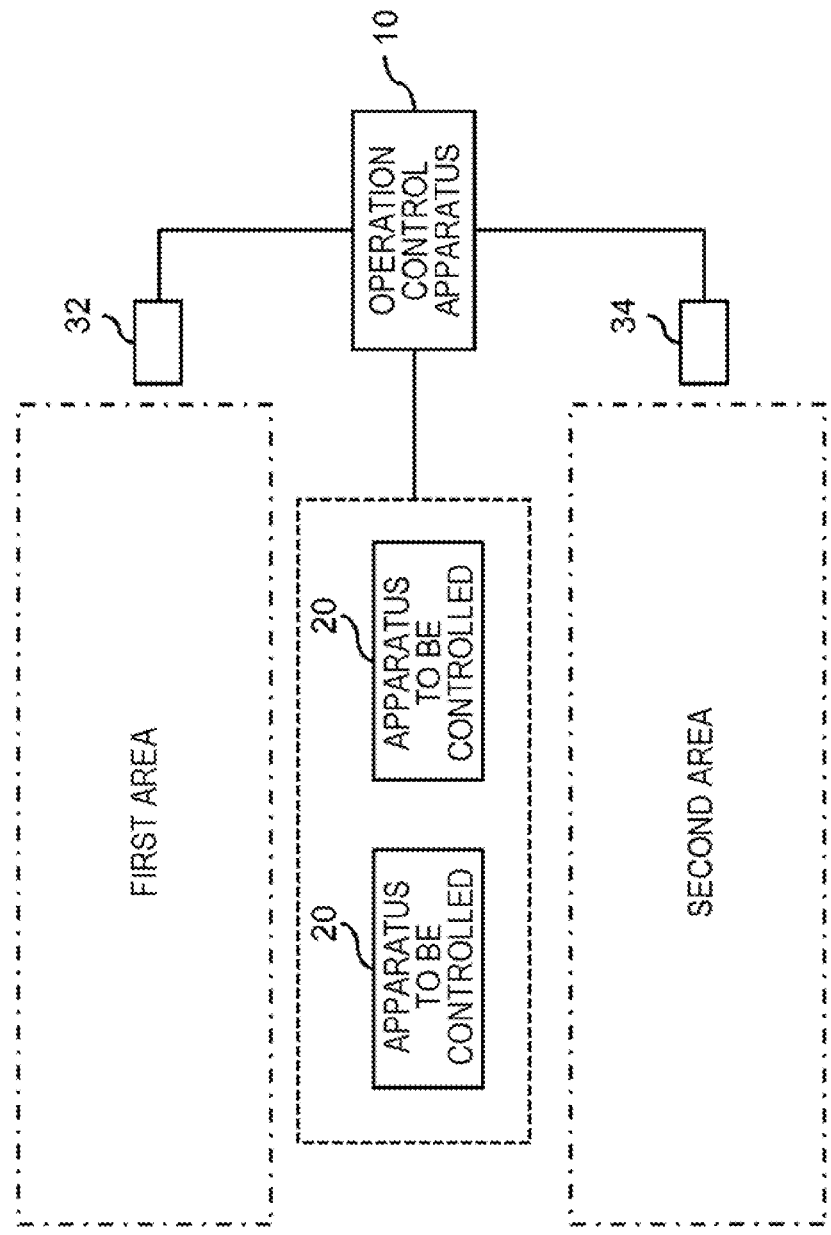
FIG. 1 is a diagram for describing a usage environment of an operation control apparatus according to a first example embodiment.

FIG. 1 is a diagram for describing a usage environment of an operation control apparatus 10 according to a present example embodiment. The operation control apparatus 10 controls an apparatus to be controlled 20 installed in an airport. The apparatus to be controlled 20 is positioned between a first area and a second area, and is used by a person moving from the second area to the first area, for example, an airplane passenger. In an example illustrated in the present figure, a plurality of apparatuses to be controlled 20 are installed. Then, the operation control apparatus 10 controls a status of congestion at the second area by controlling the apparatus to be controlled 20.

There are various combinations of the first area and the second area. As one example, the first area is an area (for example, a security area) where no one other than a passenger is allowed to enter, and the second area is an area (for example, a general area) where anyone other than a passenger is allowed to enter. In this case, a person moving from the second area to the first area is a person who will board a departing flight. Then, the apparatus to be controlled 20 is, for example, an apparatus (for example, an X-ray inspection apparatus, a body scanner, or a passenger reconciliation system: PRS) installed at a security checkpoint, but may be an apparatus (for example, an apparatus (common use terminal equipment: CUTE) installed at a check-in counter, an automated check-in apparatus (common use self-service: CUSS), or an automated baggage check-in apparatus (common use bag drop: CUBD) for performing a check-in procedure, or may be an escalator (including a case of a horizontal type).

Further, as another example, the first area is a general area, and the second area is a security area. In this case, a person moving from the second area to the first area is a person who has got off an arriving flight. Then, the apparatus to be controlled 20 may be a gate or a face recognition gate separating the first area and the second area, a terminal for immigration inspection, a declaration gate at a customs declaration area, or a terminal for customs declaration, or may be an escalator (including a case of a horizontal type).

Then, the operation control apparatus 10 controls the number of persons moving from the second area to the first area per unit time by controlling a response speed (a moving speed in a case of an escalator) of the apparatus to be controlled 20 and controlling the number of operating apparatuses to be controlled 20. By doing so, a degree of congestion at the first area can be controlled.

The operation control apparatus 10 uses an image generated by an image capture unit 32 when controlling the apparatus to be controlled 20. The image capture unit 32 captures an image of the first area. Then, the operation control apparatus 10 generates data (hereinafter, written as first congestion data) indicating a status of congestion at the first area by processing an image generated by the image capture unit 32.

Note that, the operation control apparatus 10 may further use an image generated by an image capture unit 34 when controlling the apparatus to be controlled 20. The image capture unit 34 captures an image of the second area. Then, the operation control apparatus 10 generates data (hereinafter, written as second congestion data) indicating a status of congestion at the second area by processing an image generated by the image capture unit 34.

Figure 2:
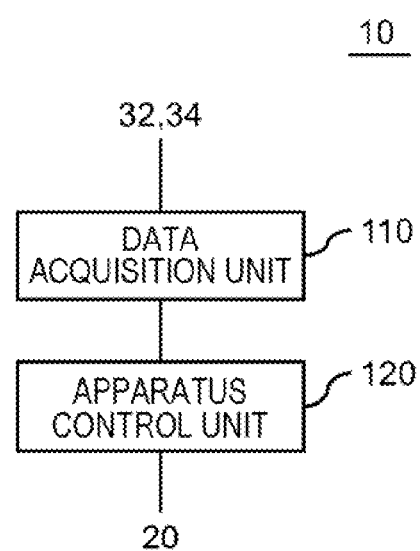
FIG. 2 is a diagram illustrating one example of a function configuration of the operation control apparatus.

FIG. 2 is a diagram illustrating one example of a function configuration of the operation control apparatus 10. In an example illustrated in the present figure, the operation control apparatus 10 includes a data acquisition unit 110 and an apparatus control unit 120.

The data acquisition unit 110 acquires first congestion data. In the present example, the data acquisition unit 110 generates the first congestion data by processing an image generated by the image capture unit 32. The image processing performed herein includes, for example, processing of counting the number of persons in a crowd. Then, the first congestion data may be a value associated with the number of persons per unit area of the first area, or may be a value associated with the number of persons in the entire first area.

The apparatus control unit 120 controls the apparatus to be controlled 20 by using the first congestion data. For example, when the first congestion data exceed a reference value, the apparatus control unit 120 reduces the number of operating apparatuses to be controlled 20 and lowers a response speed of the apparatus to be controlled 20 in such a way that the number of persons moving from the second area to the first area per unit time decreases.

A content of control information output by the apparatus control unit 120 to the apparatus to be controlled 20, for example, the number of operating apparatuses to be controlled 20 or a response speed of the apparatus to be controlled 20, is set by using, for example, a result of machine learning. The machine learning performed herein is, for example, supervised learning. In this case, training data are a combination of current first congestion data and a current state of operation (for example, at least one of the number and a response speed) of the apparatus to be controlled 20, and, added thereto as a label, first congestion data after a lapse of a predetermined period of time. However, the training data are not limited thereto. Herein, a predetermined period of time is set by using, for example, but not limited to, a distance between the first area and the second area.

Note that, when the operation control apparatus 10 uses an image generated by the image capture unit 34, the data acquisition unit 110 generates data (hereinafter, written as second congestion data) indicating a status of congestion at the second area by processing the image. Then, the apparatus control unit 120 controls the apparatus to be controlled 20 by using the first congestion data and the second congestion data. In this case, the training data are a combination of current first congestion data, current second congestion data, and a current state of operation (for example, at least one of the number and a response speed) of the apparatus to be controlled 20, and, added thereto as a label, first congestion data after a lapse of a predetermined period of time.

Figure 3:
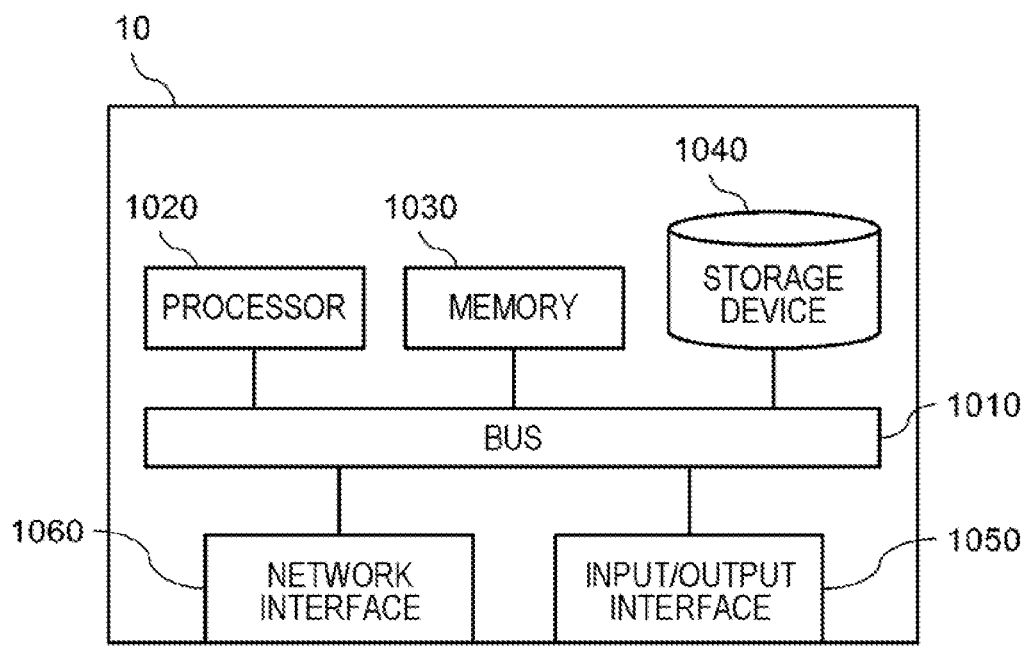
FIG. 3 is a diagram illustrating one example of a hardware configuration of the operation control apparatus.

FIG. 3 is a diagram illustrating one example of a hardware configuration of the operation control apparatus 10. The operation control apparatus 10 includes a bus 1010, a processor 1020, a memory 1030, a storage device 1040, an input/output interface 1050, and a network interface 1060.

The bus 1010 is a data transmission path through which the processor 1020, the memory 1030, the storage device 1040, the input/output interface 1050, and the network interface 1060 transmit and receive data to and from one another. However, a method of connecting the processor 1020 and the like with one another is not limited to bus connection.

The processor 1020 is a processor achieved by a central processing unit (CPU), a graphics processing unit (GPU), or the like.

The memory 1030 is a main storage apparatus achieved by a random access memory (RAM) or the like.

The storage device 1040 is an auxiliary storage apparatus achieved by a hard disk drive (HDD), a solid state drive (SSD), a memory card, a read only memory (ROM), or the like. The storage device 1040 stores program modules for achieving the functions (for example, the data acquisition unit 110 and the apparatus control unit 120) of the operation control apparatus 10. Each of the program modules is read into the memory 1030 and executed by the processor 1020, and thereby each function relevant to the program module is achieved.

The input/output interface 1050 is an interface for connecting the operation control apparatus 10 to various types of input/output devices.

The network interface 1060 is an interface for connecting the operation control apparatus 10 to a network. The network is, for example, a local area network (LAN) or a wide area network (WAN). A method by which the network interface 1060 connects to the network may be wireless connection, or may be wired connection. The operation control apparatus 10 connects to the apparatus to be controlled 20 and the image capture units 32 and 34, for example, via the network interface 1060.

Figure 4:
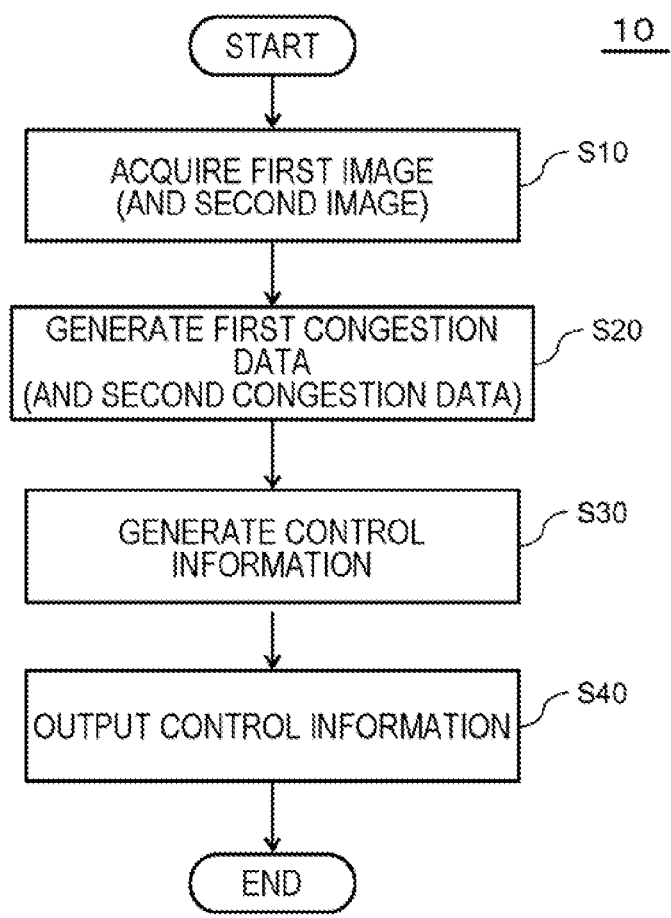
FIG. 4 is a flowchart illustrating one example of processing performed by the operation control apparatus.

FIG. 4 is a flowchart illustrating one example of processing performed by the operation control apparatus 10. The operation control apparatus 10 repeats the processing illustrated in the present figure at predetermined time intervals. A predetermined time interval herein is, for example, but not limited to, one minute to ten minutes inclusive.

First, the data acquisition unit 110 of the operation control apparatus 10 acquires a first image from the image capture unit 32. Herein, the data acquisition unit 110 acquires a second image from the image capture unit 34 as needed (Step S10). Next, the data acquisition unit 110 generates first congestion data by processing the first image. Herein, when a second image is acquired, the data acquisition unit 110 also generates second congestion data by processing the second image (Step S20).

Next, the apparatus control unit 120 generates control information by using the first congestion data. Herein, when second congestion data are generated by the data acquisition unit 110, the apparatus control unit 120 generates control information by using the first congestion data and the second congestion data (Step S30). Next, the apparatus control unit 120 outputs the generated control information to the apparatus to be controlled 20 (Step S40).

Then, the apparatus to be controlled 20 operates according to the control information acquired from the operation control apparatus 10.

As described above, according to the present example embodiment, the operation control apparatus 10 controls the apparatus to be controlled 20 by using first congestion data. The first congestion data indicates a status of congestion at the first area. Then, the apparatus to be controlled 20 is an apparatus used by a person moving from the second area to the first area. Thus, the number of persons entering the first area can be controlled by controlling the apparatus to be controlled 20. Accordingly, the operation control apparatus 10 can prevent congestion at the first area.

Second Example Embodiment

Figure 5:
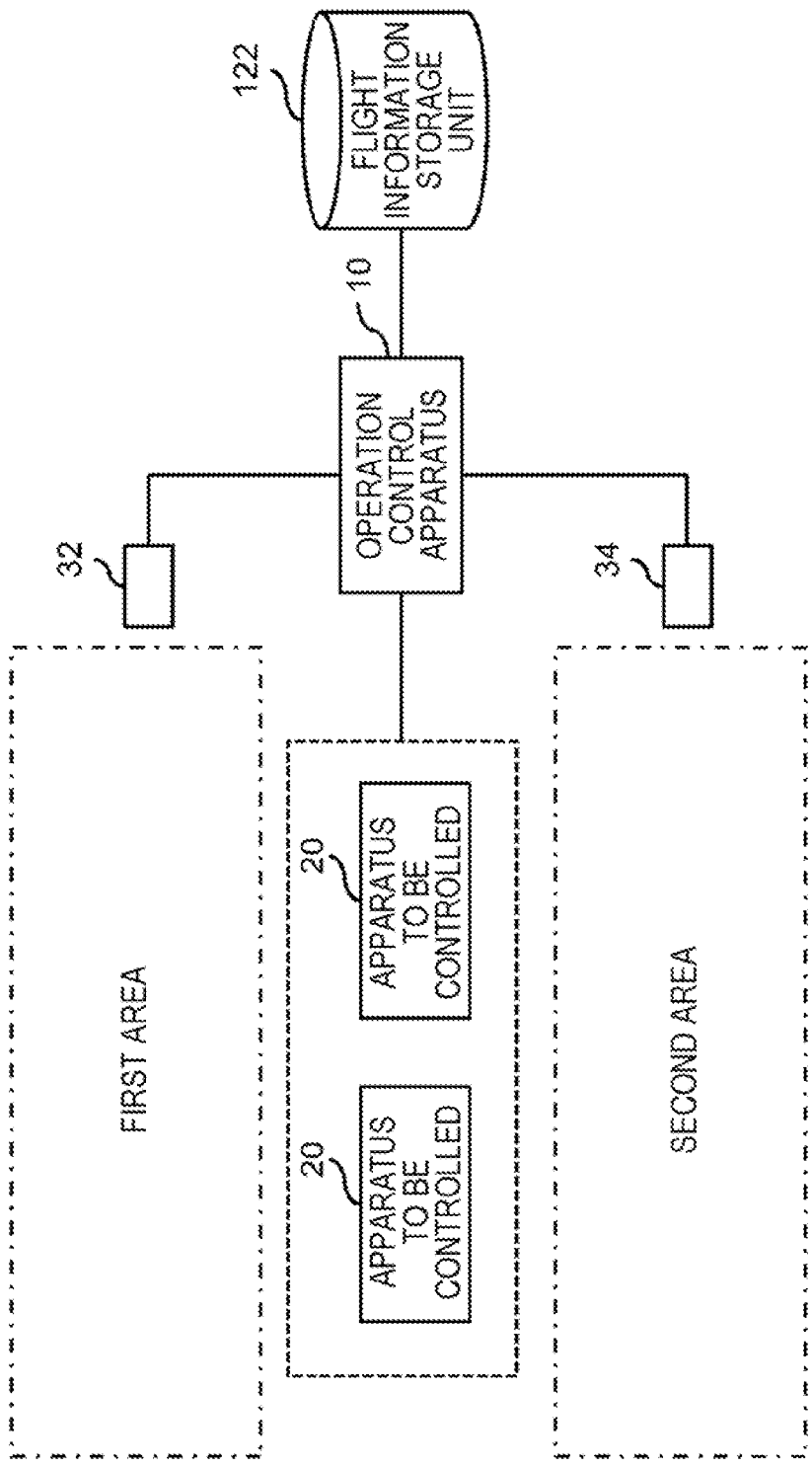
FIG. 5 is a diagram describing a usage environment of an operation control apparatus according to a second example embodiment.

FIG. 5 is a diagram describing a usage environment of an operation control apparatus 10 according to a present example embodiment. The operation control apparatus 10 according to the present example embodiment has a configuration similar to the operation control apparatus 10 according to the first example embodiment except for a point that information stored in a flight information storage unit 122 is further used when an apparatus to be controlled 20 is controlled. In an example illustrated in the present figure, the flight information storage unit 122 is positioned outside the operation control apparatus 10, but may be a part of the operation control apparatus 10.

Specifically, a data acquisition unit 110 of the operation control apparatus 10 acquires information (hereinafter, written as flight information) stored in the flight information storage unit 122. The flight information includes at least information relating to a flight (hereinafter, written as a departing flight) that is going to depart from an airport, for example, at least one of a type of airplane, a capacity, and a number of persons on board, and an estimated time of departure. The flight information acquired by the data acquisition unit 110 is preferably information relating to, for example, a departing flight of which an estimated time of departure is within a predetermined period of time from a current time.

Then, when controlling the apparatus to be controlled 20, an apparatus control unit 120 further uses flight information in addition to first congestion data (and second congestion data). Then, in machine learning used by the apparatus control unit 120, training data further include flight information. Specifically, the training data are a combination of current first congestion data (and second congestion data), flight information, and a state of operation (for example, at least one of the number and a response speed) of the apparatus to be controlled 20, and, added thereto as a label, first congestion data after a lapse of a predetermined period of time. Then, the apparatus control unit 120 generates control information by using machine learning, first congestion data (and second congestion data), and flight information.

Congestion at a first area can be prevented also according to the present example embodiment, similarly to the first example embodiment. Further, according to the present example embodiment, the operation control apparatus 10 further uses flight information, too. Thus, the operation control apparatus 10 uses a person departing from the first area by a departing flight to control the apparatus to be controlled 20. Therefore, congestion at the first area can be prevented more accurately.

While the example embodiments of the present invention have been described with reference to the drawings, the example embodiments are illustrative of the present invention, and various configurations other than the above may be employed.

Further, while a plurality of steps (processes) are described in order in a plurality of flowcharts used in the above description, execution order of the steps to be executed in each of the example embodiments is not limited to the described order. In each of the example embodiments, the order of the illustrated steps can be changed as long as the change does not detract from contents. Further, the above example embodiments can be combined as long as contents do not contradict each other.

The whole or part of the above-described example embodiments can be described as, but not limited to, the following supplementary notes.

1. An operation control apparatus including:
    a data acquisition unit that acquires first congestion data indicating a status of congestion at a first area in an airport; and
    an apparatus control unit that controls, by using the first congestion data, an apparatus to be controlled that is positioned between a second area in the airport and the first area and should be used by an airplane passenger.
2. The operation control apparatus according to supplementary note 1, wherein
    the data acquisition unit generates the first congestion data by processing first image data generated by capturing an image of the first area.
3. The operation control apparatus according to supplementary note 1 or 2, wherein
    a plurality of the apparatuses to be controlled are positioned between the first area and the second area, and
    the apparatus control unit controls a number of the plurality of operating apparatuses to be controlled.
4. The operation control apparatus according to any one of supplementary notes 1 to 3, wherein
    the apparatus control unit controls a response speed of the apparatus to be controlled.
5. The operation control apparatus according to any one of supplementary notes 1 to 4, wherein
    the first area is one of a general area and a security area, and the second area is another of the general area and the security area.
6. The operation control apparatus according to supplementary note 5, wherein
the first area is the security area,
the second area is the general area, and
the apparatus to be controlled is installed at a security checkpoint.
7. The operation control apparatus according to any one of supplementary notes 1 to 6, wherein
The apparatus control unit controls the apparatus to be controlled by further using flight information on a departing flight of the airport.
8. The operation control apparatus according to supplementary note 7, wherein
the flight information includes at least one of a type of airplane and a number of persons on board, and an estimated time of departure.
9. An operation control method including:
by a computer,
acquiring first congestion data indicating a status of congestion at a first area in an airport and second congestion data indicating a status of congestion at a second area in the airport; and
controlling, by using the first congestion data and the second congestion data, an apparatus to be controlled that is positioned between the first area and the second area and should be used by an airplane passenger.
10. The operation control method according to supplementary note 9, further including,
by the computer,
generating the first congestion data by processing first image data generated by capturing an image of the first area.
11. The operation control method according to supplementary note 9 or 10, wherein
a plurality of the apparatuses to be controlled are positioned between the first area and the second area,
the operation control method further including,
by the computer,
controlling a number of the plurality of operating apparatuses to be controlled.
12. The operation control method according to any one of supplementary notes 9 to 11, further including,
by the computer,
controlling a response speed of the apparatus to be controlled.
13. The operation control method according to any one of supplementary notes 9 to 12, wherein
the first area is one of a general area and a security area, and
the second area is another of the general area and the security area.
14. The operation control method according to supplementary note 13, wherein
the first area is the security area,
the second area is the general area, and
the apparatus to be controlled is installed at a security checkpoint.
15. The operation control method according to any one of supplementary notes 9 to 14, further including,
by the computer,
controlling the apparatus to be controlled by further using flight information on a departing flight of the airport.
16. The operation control method according to supplementary note 15, wherein
the flight information includes at least one of a type of airplane and a number of persons on board, and an estimated time of departure.
17. A program causing a computer to include:
a function of acquiring first congestion data indicating a status of congestion at a first area in an airport and second congestion data indicating a status of congestion at a second area in the airport; and
a function of controlling, by using the first congestion data and the second congestion data, an apparatus to be controlled that is positioned between the first area and the second area and should be used by an airplane passenger.
18. The program according to supplementary note 17, further causing the computer to execute
generating the first congestion data by processing first image data generated by capturing an image of the first area.
19. The program according to supplementary note 17 or 18, wherein
a plurality of the apparatuses to be controlled are positioned between the first area and the second area,
the program further causing the computer to execute
controlling a number of the plurality of operating apparatuses to be controlled.
20. The program according to any one of supplementary notes 17 to 19, further causing the computer to execute
controlling a response speed of the apparatus to be controlled.
21. The program according to any one of supplementary notes 17 to 20, wherein
the first area is one of a general area and a security area, and
the second area is another of the general area and the security area.
22. The program according to supplementary note 21, wherein
the first area is the security area,
the second area is the general area, and
the apparatus to be controlled is installed at a security checkpoint.
23. The program according to any one of supplementary notes 17 to 22, further causing the computer to execute
controlling the apparatus to be controlled by further using flight information on a departing flight of the airport.
24. The program according to supplementary note 23, wherein
the flight information includes at least one of a type of airplane and a number of persons on board, and an estimated time of departure.

| [Reference signs List] | |
| --- | --- |
| 10 | Operation control apparatus |
| 20 | Apparatus to be controlled |
| 32 | Image capture unit |
| 34 | Image capture unit |
| 110 | Data acquisition unit |
| 120 | Apparatus control unit |
| 122 | Flight information storage unit |

What is claimed is:

1. A system comprising:
a first image capture unit configured to capture a first image of a first area in an airport;
a storage unit configured to store flight information for each of a plurality of flights including a number of persons on board; and
an operation control apparatus configure to control a plurality of escalators based at least on the first image and the flight information, the operator controller apparatus comprising:
at least one memory storing instructions; and
at least one processor configured to execute the instructions to perform operations comprising:
receiving, from the first image capture unit, the first image of the first area in the airport as captured by the first image capture unit;
retrieving, from the storage unit, the fight information stored in the storage unit for each of the plurality of flights including the information on the number of persons on board;
generating, based on the first image data and the flight information, first congestion data indicating a degree of congestion at the first area in the airport; and
when the degree of congestion indicated by the first congestion data that has been generated is greater than a threshold, controlling, by the operation control apparatus and based on the first congestion data that the operation control apparatus has generated based on the first image data and the flight information, the plurality of escalators that is are positioned between a second area in the airport and the first area and that are used by airplane passengers, to reduce the degree of congestion indicated by the first congestion data,
wherein controlling the plurality of escalators comprises either or both of:
the operation control apparatus reducing a number of the escalators that are currently operational; and
the operation control apparatus reducing a speed of the escalators causing a reduction of a number of persons moving from the second area to the first area and accordingly reducing the degree of congestion.

2. The system according to claim 1, wherein
the first area is one of a general area and a security area, and
the second area is another of the general area and the security area.

3. The system according to claim 2, wherein
the first area is the security area,
the second area is the general area, and
the plurality of escalators are installed at a security checkpoint.

4. The system according to claim 1, wherein
the flight information for each flight further includes at least one of a type of airplane and an estimated time of departure.

5. An operation control method performed by a system comprising a first image capture unit, a storage unit, and an operation control apparatus, the method comprising:
capturing, by the first image capture unit, a first image of a first area in an airport;
storing, by the storage unit, flight information for each of a plurality of flights including a number of persons on board;
receiving, by the operation control apparatus and from the first image capture unit, the first image of the first area in the airport as captured by the first image capture unit;
retrieving, by the operation control apparatus and from the storage unit, the fight information stored in the storage unit for each of the plurality of flights including the information on the number of persons on board;
generating, by the operation control apparatus and based on the first image data and the flight information, first congestion data indicating a degree of congestion at the first area in the airport; and
controlling, by the operation control apparatus and when the degree of congestion indicated by the first congestion data that has been generated is greater than a threshold, a plurality of escalators based at least on the first image and the flight information, to reduce the degree of congestion indicated by the first congestion data, the plurality of escalators positioned between a second area in the airport and the first area and that are used by airplane passengers,
wherein controlling the plurality of escalators comprises either or both of:
the operation control apparatus reducing a number of the escalators that are currently operational; and
the operation control apparatus reducing a speed of the escalators causing a reduction of a number of persons moving from the second area to the first area and accordingly reducing the degree of congestion.

6. The operation control method according to claim 5, wherein
the first area is one of a general area and a security area, and
the second area is another of the general area and the security area.

7. The operation control method according to claim 6, wherein
the first area is the security area,
the second area is the general area, and
the apparatus to be controlled is installed at a security checkpoint.

8. The operation control method according to claim 5, wherein the flight information for each flight further includes at least one of a type of airplane and an estimated time of departure.

9. A non-transitory computer readable medium storing a program executable by an operation control apparatus of a system to perform processing, the system comprising a first image capture unit configured to capture a first image of a first area in an airport and a storage unit configured to store flight information for each of a plurality of flights including a number of persons on board, the processing comprising:
receiving, by the operation control apparatus and from the first image capture unit, the first image of the first area in the airport as captured by the first image capture unit;
retrieving, by the operation control apparatus and from the storage unit, the fight information stored in the storage unit for each of the plurality of flights including the information on the number of persons on board;
generating, by the operation control apparatus and based on the first image data and the flight information, first congestion data indicating a degree of congestion at the first area in the airport; and
controlling, by the operation control apparatus and when the degree of congestion indicated by the first congestion data that has been generated is greater than a threshold, a plurality of escalators based at least on the first image and the flight information, to reduce the degree of congestion indicated by the first congestion data, the plurality of escalators positioned between a second area in the airport and the first area and that are used by airplane passengers,
wherein controlling the plurality of escalators comprises either or both of:
  the operation control apparatus reducing a number of the escalators that are currently operational; and
  the operation control apparatus reducing a speed of the escalators causing a reduction of a number of persons moving from the second area to the first area and accordingly reducing the degree of congestion.

* * * * *